July 26, 1938. W. F. BRÜGMANN 2,124,728
PRINTER'S REGISTER HOOK
Filed April 25, 1936
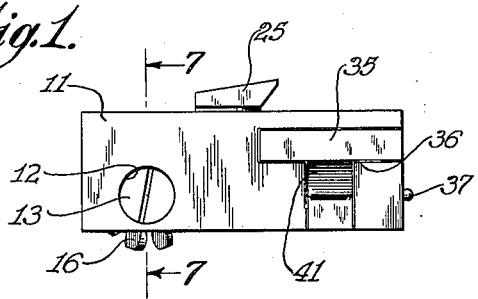
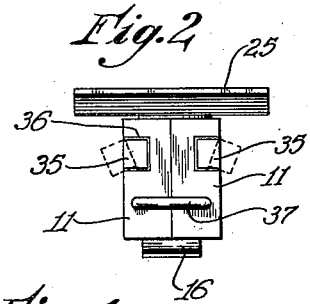
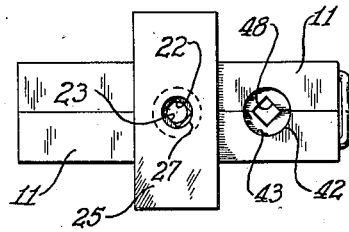
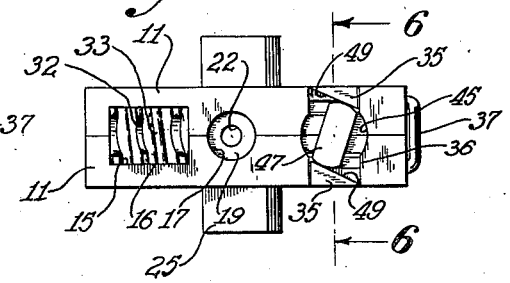
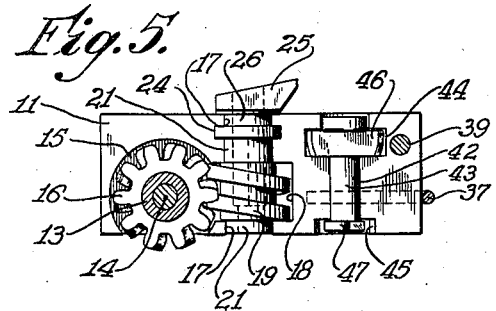
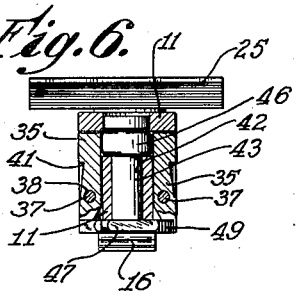
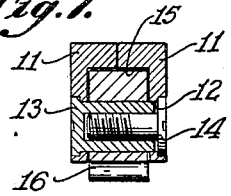
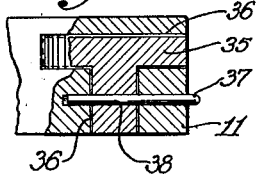
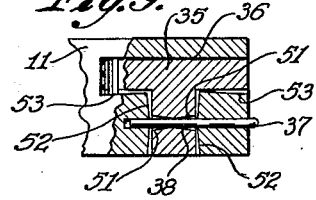
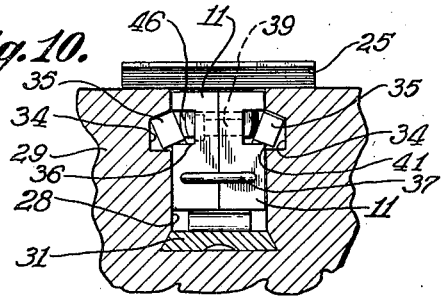
INVENTOR.
William F. Brügmann
BY
Rasmussen & Brugman
ATTORNEYS.

Patented July 26, 1938

2,124,728

UNITED STATES PATENT OFFICE 2,124,728

PRINTER'S REGISTER HOOK

William F. Brügmann, Evanston, Ill.

Application April 25, 1936, Serial No. 77,473

18 Claims. (Cl. 101—388)

This invention relates in general to printing plate mounting devices, and more particularly to an improved printer's register hook for holding plates upon a base or cylinder and adjusting the plates relative thereto.

A principal object of the invention is the provision of novel locking means associated with a printer's register hook which are adapted to be positively moved relative to the hook into and out of locking engagement with the supporting base or cylinder.

Another important object of the invention is the provision of locking mechanism which is so mounted in a printer's register hook as to automatically adapt itself under all circumstances to to the contour of the groove with which it cooperates in the supporting base or cylinder to prevent deformation or undue wear of said groove in the movements of the hook relative thereto.

A further important object of the invention is the provision of novel driving or adjusting mechanism in a printer's register hook, comprising a worm gear or pinion adapted to engage a rack in a groove in the supporting base or cylinder and mounted in the hook in engagement with a driving worm, the side surfaces of the teeth of the worm gear against which the worm acts to move the hook forwardly into engagement with a printing plate being curved to provide surface contact with the worm, and the opposite side surfaces of the worm gear teeth being straight to insure full contact with the teeth of the rack, so as to minimize wear and prevent deformation of the worm, worm gear and rack.

Another important object of the invention is the provision of an unusually strong and durable printer's register hook having a simplified construction and arrangement of parts which greatly facilitates its manufacture.

Numerous other objects and advantages of the invention will be apparent as it is better understood from the following description, which, when taken in connection with the accompanying drawing, illustrates a preferred embodiment thereof.

In the drawing:

Figure 1 is a side elevational view of a printer's register hook embodying the features of the instant invention;

Fig. 2 is a front elevation taken from the right of Fig. 1;

Fig. 3 is a top plan view;

Fig. 4 is a bottom plan view;

Fig. 5 is a side elevational view similar to Fig. 1 with parts in section and the nearest body portion and locking member removed;

Fig. 6 is a vertical section taken substantially on the line 6—6 of Fig. 4;

Fig. 7 is a vertical sectional view taken substantially on the line 7—7 of Fig. 1;

Fig. 8 is a detail vertical section through one of the locking members;

Fig. 9 is a view similar to Fig. 8 of a modified form of locking member; and

Fig. 10 is a front elevation similar to Fig. 2 showing the hook mounted in a supporting base or cylinder.

Referring more particularly to the drawing, the printer's register hook disclosed therein is substantially rectangular in shape and relatively narrow, and comprises a pair of complementary body portions 11 within which are mounted the several movable parts of the hook. Each of the body portions 11 is provided with a horizontally disposed, laterally extending bore 12 adjacent its lower rear end (Figs. 1 and 7), the outer portion of which is recessed or counterbored to provide an interiorly disposed shoulder against which the head of a hollow interiorly threaded stud shaft 13 or a bolt 14 screwed into the shaft 13 abuts. The exterior diameter of the shaft 13 is substantially the same as that of the bores 12, and the lengths of the shaft 13 and bolt 14 are such that when they are screwed together there will be a slight clearance adjacent their inner ends and they will rigidly secure the rear ends of the body portions 11 together.

Each of the body portions 11 is also recessed or counterbored adjacent the inner end of the bore 12 to provide an interiorly disposed chamber 15 (Figs. 4, 5 and 7) which is open at the bottom, and within which is housed a pinion or worm gear 16 rotatably mounted upon the stud shaft 13.

A vertically disposed, centrally located bore 17 (Figs. 3, 4 and 5) extends through the body portions 11, and is enlarged adjacent the central portion of the worm gear 16 to provide a chamber 18 which communicates at its rear end with the chamber 15. A worm 19 is housed within the chamber 18 in driving engagement with the gear 16, and is provided with reduced end shaft portions 21 formed integrally therewith and mounted for rotation in the bore 17. The shoulders formed at the inner ends of the reduced portions 21 of the worm 19 bear against the upper and lower walls of the chamber 18 to prevent axial displacement of the worm. An axial bore 22 extends through the worm 19, the major portion of which, from the upper end, downwardly, is broached or otherwise enlarged to provide a recess 23 of angular cross section adapted to be engaged by a suitable tool or key (not shown) to rotate the worm. The lower end of the angular recess 23, as indicated in dotted lines in Fig. 5, will act as a stop for such tool or key when it is inserted into the worm.

The bore 17 through the body portions 11 is enlarged adjacent the upper end of the worm 19 (Fig. 5) to provide an annular recess within which is rotatably mounted a collar or circumferential flange portion 24 forming the lower end of a swivel, clamp or printing plate engaging jaw member 25. The intermediate portion of the jaw member 25 comprises a reduced shaft 26 mounted for rotation in the upper end of the bore 17. An axial or vertical bore 27 extends through the jaw member 25 in alignment with the recess 23 in the worm 19 to enable the driving tool or key to be freely inserted into said recess.

It will be apparent that with the two body portions 11 separated, the worm 19 and jaw member 25 may be readily positioned as shown in Fig. 5, and that subsequent securing of the body portions together will prevent vertical movements of the worm and jaw member while permitting rotation thereof.

Referring to Fig. 10, the printer's register hook is adapted to be seated in a longitudinal groove 28 in a supporting base or cylinder 29 of well-known construction. A rack 31 is formed in or rigidly secured within the bottom of the groove 28 in any suitable manner, for example, as is disclosed in my co-pending application Serial No. 76,454, filed April 25, 1936. The gear 16 meshes with the rack 31, so that rotation thereof through the agency of the worm 19 will cause longitudinal movement of the hook in the groove 28.

Forward movement of the hook, to the right in Figs. 1 and 5, will be accomplished by a clockwise movement (Fig. 3) of the worm 19 resulting in downward pressure by the lower surface of the teeth of the worm against the upper side surfaces of the teeth of the gear 16 then in mesh with the worm. These side surfaces of the teeth of the gear 16 are those at the forward side when the teeth are in engagement with the rack 31, and the driving pressure against them is very great when the jaw member 25 is in engagement with a printing plate (not shown). These side surfaces of the teeth of the gear 16 are therefore curved or cut as a worm gear, as best shown at 32 in Fig. 4, to insure surface contact with the under side of the teeth of the worm 19. The opposite side surfaces of the teeth of the gear 16, however, are not so curved, but are cut straight, as indicated at 33 in Fig. 4, to insure full surface contact with the teeth of the rack 31. In this manner, wear of these parts is minimized, and deformation thereof is prevented.

If both side surfaces of the teeth of the gear 16 were cut to conform to the rack 31, only point contact would be had between the gear 16 and the worm 19, and such undue wear would result as to soon cut through the case hardening on the forward and lower surfaces of the teeth of these members, respectively. On the other hand, if both side surfaces of the teeth of the gear 16 were cut to conform to the worm 19, the hardened surfaces of the former would quickly deform the unhardened rack 31. With the gear 16 cut as herein disclosed, the resulting point contact between it and the worm 19 when the hook is being moved rearwardly is not harmful, since there is practically no resistance to such movements.

In order to prevent the accidental removal of the printer's register hook from the groove 28, and to lock it in the groove for longitudinal movement only, the following mechanism is provided. The groove 28 is undercut on each side adjacent the top thereof to form longitudinal recesses 34, the top surfaces of which preferably slant upwardly toward the center of the groove. A locking member 35 is pivotally mounted in each of the body portions 11 of the hook, and is adapted to be positively moved into and out of engagement with its respective recess 34 (Figs. 2 and 10) in the base member 29.

The locking members 35 are preferably T-shaped (Figs. 1 and 8), and are each pivotally mounted within a T-shaped recess 36 in the outer surface of a body portion 11 adjacent its forward end on one arm of a horizontally disposed, U-shaped bolt or retaining member 37, which extends through suitable apertures in the body portions and bores 38 in the lower vertical arms of the locking members (Figs. 6 and 8). As will be seen from Figs. 2 to 4, the bolt 37, in addition to acting as a bearing shaft for both of the locking members 35, functions to rigidly secure the forward ends of the two body portions 11 together. A slight spread may be given the ends of the bolt 37 to insure against accidental displacement thereof after assembly. The forward, cross portion of the bolt 37 will prevent the ends of the bolt from moving rearwardly into engagement with the worm 19, if the apertures in the body portions 11 within which the bolt is housed are inadvertently drilled through to the chamber 18.

Additional means may be provided, if desired, for securing the forward ends of the body portions 11 together, such as a horizontally disposed screw 39 (Figs. 5 and 10).

The outer surface of the vertical portion or lower arm of each of the locking members 35 is recessed or under-cut at 41 directly below the upper, horizontal arm thereof (Figs. 1, 6 and 10), so that it will not extend beyond the plane of the side of the body portion 11 when the locking members are swung into active position.

The inner surface of each of the body portions 11 is recessed to provide a vertical bore 42 centrally positioned between the vertical arms of the locking members 35 (Figs. 3, 5 and 6). An actuating member 43 is rotatably mounted within the bore 42, and the latter is enlarged adjacent its upper end and at its lower end to provide chambers 44 and 45, respectively, (Figs. 4 and 5) communicating with or extending into the outer T-shaped recesses 36. The actuator 43 has upper and lower lateral extensions or cam portions 46 and 47, which are disposed at substantially right angles to each other within the chambers 44 and 45, respectively. These cams 46 and 47 are preferably formed integral with the actuating member 43, and co-operate with the horizontal walls of the chambers 44 and 45 to prevent axial displacement of the actuating member.

A vertically disposed, angular recess 48 is provided in the upper end of the actuating member 43 (Fig. 3) within which the same tool or key that is used to drive the worm 19 may be inserted for rotating the member 42. The lower ends of each of the locking members 35 are cut away on their inner surfaces to provide complementary cam portions 49 (Figs. 4 and 6) which co-operate with the lower cam member 47 of the actuator 43. The upper cam member 46 co-operates with the inner surfaces of the locking members 35 adjacent the upper ends thereof.

Since the pivotal axes of the locking members 35, i. e. the shaft portions of the U-bolt 37, are intermediate the end portions thereof with which the cams 46 and 47 of the actuating member 43 co-operate, and the cams are angularly disposed relative to each other as shown, rotation of the actuating member 43 in one direction or the other will positively swing the locking members 35 between their full and dotted line positions of Fig. 2. In other words, to lock the register hook in the groove 28, the operator inserts the tool or key in the recess 48 (Fig. 3) and turns it in a clockwise direction. In this movement of the actuating member 43, the upper cam 46 moves the upper arms of the locking members 35 outwardly to extended position into the recesses 34, as shown in Fig. 10. At the same time, the lower cam 47 will be rotated through a little more than 90 degrees in a counterclockwise direction from its position of Fig. 4 to permit the lower ends of the locking members 35 to be swung inwardly.

When the operator desires to unlock the hook, he has merely to turn the actuating member 43 in the opposite direction, back to its original position of Figs. 3 to 6. In this movement, the upper cam 46 is rotated out of the path of movement of the upper arms of the locking members 35, and the lower cam 47 acts upon the cam portions 49 of the locking members to force them outwardly to positively move the locking members to retracted position. In this position, as shown in Fig. 4, the lower cam 47 will lock the members 35 against accidental movement from their retracted position. Likewise, the upper cam 46 having been rotated beyond "dead center" position in being moved to its position of Fig. 10 will positively lock the members 35 against accidental movement from their extended position.

If the printing plate supporting member 29 is a plate cylinder and the groove 28 is therefore cut on a helix on the circumference of the cylinder, the upper surfaces of the printer's register hook above described and of the locking members 35 may be shaped to conform to the outer surface of the cylinder and the contour of the recesses 34, respectively.

In free movements of the register hook longitudinally of the groove 28, the upper, horizontal arms of the locking members 35 will slide freely within the recesses 34. When a strain is being imposed upon the jaw member 25 by a printing plate during actual registering movements of the hook, however, the latter will be subjected to a slight vertical tilting movement within the groove 28. That is, the forward end of the hook (the right hand end in Fig. 1) will be strained upwardly. Further forward movement of the register hook may result in the forward ends of the locking members 35 gouging into or deforming the upper surfaces of the recesses 34 in the plate supporting member 29. This is a well known phenomenon, and heretofore there has been no satisfactory way of combating it.

The modified construction of the locking members 35 and their associated recesses 36 in the body portions 11 shown in Fig. 9, however, eliminates the possibility of so deforming the printing plate supporting member. The bore 38 in the vertical arm of the locking member 35, through which one arm of the shaft or U-bolt 37 extends, is enlarged at each end at 51 to provide a tapered clearance, increasing from a point adjacent the center of the bore toward the outer ends thereof. This permits vertical rocking of the locking member 35 on the shaft 37.

To accommodate such movements of the locking member 35, the forward and rear vertical walls of the vertical portion of the recess 36 are flared or cut away slightly at an angle at 52 upwardly and downwardly from points adjacent the shaft 37. The lower wall of the horizontal portion of the recess 36 is likewise flared outwardly at 53. The top horizontal wall of the recess 36 need not be so cut away, since the upper surface of the locking member 35 will be out of the recess and in engagement with the top wall of the recess 34 in the plate supporting member 29.

With the above described arrangement shown in Fig. 9, upward tilting of the forward end of the register hook in the groove 28 during actual registering movements of the hook will not cause the locking members 35 to gouge into the top walls of the recesses 34. Rather, it will result in a tilting of the locking members 35 relative to the body portions 11 of the hook, so that their upper surfaces will conform at all times with the contour of the top walls of the recesses 34.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A printer's register hook, comprising a pair of separable body portions, co-operating threaded members adapted to secure said body portions together at one end, and a U-shaped member having its free ends removably inserted into said body portions to secure the latter together at their other end.

2. In a printer's register hook adapted to be positioned for longitudinal movement in a groove in a printing plate supporting member having a rack therein, driving mechanism, comprising a gear adapted to engage said rack, and a worm meshing with said gear for rotating the latter to drive the hook forward and backward in said groove, the side surfaces of the teeth of said gear against which said worm acts to move the hook forwardly being curved to provide surface contact with the worm, and the opposite side surfaces of the teeth of said gear being straight to insure full contact with the teeth of said rack.

3. A printer's register hook, comprising a body portion, a vertically disposed locking member mounted on said body portion for angular movement in a vertical plane between retracted and extended positions, and means mounted on said body portion for moving said locking member to said positions.

4. A printer's register hook, comprising a body portion, a locking member mounted in said body portion for angular movement in a vertical plane between retracted and extended positions, and means for positively moving said locking member to both positions.

5. A printer's register hook, comprising a body portion, a locking member mounted in said body portion for angular movement in a vertical plane between retracted and extended positions, and means for positively moving said locking member to both positions, and maintaining it against accidental displacement from either position.

6. A printer's register hook, comprising a body portion, a locking member pivotally mounted in said body portion for swinging movement between retracted and extended positions, and means mounted in said body portion for positively moving said member to both positions.

7. A printer's register hook, comprising a body portion, a substantially vertically disposed locking member pivotally mounted on a substantially horizontal pivot in said body portion for swinging movement between retracted and extended positions, and means mounted in said body portion for positively moving said member to both positions, and locking it against accidental displacement from either position.

8. A printer's register hook, comprising a body portion, a substantially vertically disposed locking member pivotally mounted on a substantially horizontal pivot in said body portion for swinging movement between retracted and extended positions, and an actuating member rotatably mounted in said body portion for positively moving said locking member to both positions.

9. A printer's register hook, comprising a body portion, a substantially vertically disposed locking member pivotally mounted on a substantially horizontal pivot in said body portion for swinging movement between retracted and extended positions, and an actuating member rotatably mounted in said body portion for moving said locking member to both positions, and maintaining it against accidental displacement therefrom.

10. A printer's register hook, comprising a body portion, a locking member pivotally mounted in said body portion for swinging movement between retracted and extended positions, and an actuating member rotatably mounted in said body portion for moving said locking member to both positions, said actuating member including a pair of cam portions co-operating with said locking member on opposite sides of the pivotal axis thereof.

11. In a printer's register hook adapted to be moved longitudinally in a recessed groove in a printing plate supporting member, locking members mounted in the hook for movement in two planes substantially at right angles to each other so as to be movable into and out of recessed portions of said groove and to automatically adapt themselves under all circumstances to the contour of the recessed portions of said groove.

12. In a printer's register hook adapted to be moved longitudinally in a recessed groove in a printing plate supporting member, supporting members mounted in the hook, locking members mounted on said supporting members for movement between retracted and extended positions, and means mounted in the hook for so moving said locking members, said locking members being adapted when in extended position to engage the recessed portions of said groove and having enlarged recesses surrounding said supporting members to permit movement of the hook relative thereto to automatically adapt the locking members under all circumstances to the contour of the recessed portions of said groove.

13. A printer's register hook, comprising a body portion, a supporting member mounted in said body portion, and a locking member mounted on said supporting member for movement between retracted and extended positions relative to said body portion, said locking member also being movable relative to said supporting member and said body portion when in extended position in a plane parallel to the longitudinal axis of the hook.

14. A printer's register hook, comprising a body portion, a shaft mounted in said body portion, and a locking member mounted for rotation on said shaft and for limited movements relative thereto in a plane including the shaft.

15. A printer's register hook, comprising a pair of separable body portions, a locking member associated with each of said body portions, and means for securing said body portions together and mounting said locking members therein.

16. A printer's register hook, comprising a pair of separable body portions, a U-shaped member for holding said body portions together at one end, and a pair of locking members pivotally mounted on said U-shaped member for movement relative to said body portions.

17. A printer's register hook, comprising a body portion, a shaft mounted in said body portion, and a locking member having an aperture surrounding said shaft with a diameter substantially equal to that of the shaft adjacent its central portion and increasing in size towards the ends thereof, whereby said locking member is adapted to be rotated on said shaft between retracted and extended positions and is movable in extended position relative to said body portion in a plane parallel to the axis of said shaft.

18. A printer's register hook adapted to be mounted in a groove in a printing plate supporting member having undercut longitudinal recesses therein, comprising a body portion, driving mechanism for propelling said hook mounted in said body portion adjacent the center and the rear end thereof, a printing plate engaging member mounted on said body portion adjacent the center thereof, substantially vertically disposed locking members pivotally mounted in said body portion adjacent the forward end thereof for movement between extended and retracted positions, said locking members having a longitudinal extension adjacent the upper end adapted to be moved into said longitudinal recesses in the printing plate supporting member when the locking members are moved to extended position and extending into close proximity to said printing plate engaging member, and means for moving said locking members between retracted and extended positions.

WILLIAM F. BRÜGMANN.